(12) United States Patent
Nakamata

(10) Patent No.: US 9,105,292 B2
(45) Date of Patent: Aug. 11, 2015

(54) MAGNETIC RECORDING MEDIUM AND METHOD OF MANUFACTURING SAME

(71) Applicant: FUJI ELECTRIC CO., LTD., Kawasaki (JP)

(72) Inventor: Yuko Nakamata, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 31 days.

(21) Appl. No.: 13/859,467

(22) Filed: Apr. 9, 2013

(65) Prior Publication Data

US 2013/0337290 A1 Dec. 19, 2013

(30) Foreign Application Priority Data

Jun. 15, 2012 (JP) ................................ 2012-136078

(51) Int. Cl.
- *G11B 5/66* (2006.01)
- *G11B 5/72* (2006.01)
- *G11B 5/84* (2006.01)

(52) U.S. Cl.
CPC ........ *G11B 5/722* (2013.01); *G11B 5/72* (2013.01); *G11B 5/8408* (2013.01)

(58) Field of Classification Search
None
See application file for complete search history.

(56) References Cited

U.S. PATENT DOCUMENTS

| | | | |
|---|---|---|---|
| 5,871,841 A * | 2/1999 | Kuratomi | 428/332 |
| 6,358,636 B1 * | 3/2002 | Yang et al. | 428/833.2 |
| 2003/0224216 A1 * | 12/2003 | Hiratsuka et al. | 428/694 ST |
| 2007/0087227 A1 * | 4/2007 | Ma et al. | 428/833.1 |
| 2013/0034746 A1 * | 2/2013 | Katano et al. | 428/833.2 |

FOREIGN PATENT DOCUMENTS

| | | |
|---|---|---|
| JP | 9-138943 | 5/1997 |
| JP | 2001-266328 | 9/2001 |
| JP | 2006-114182 | 4/2006 |
| JP | 2006-127619 | 5/2006 |
| JP | 2007-46115 | 2/2007 |
| JP | 2008-123646 | 5/2008 |

* cited by examiner

*Primary Examiner* — Holly Rickman

(57) ABSTRACT

A magnetic recording medium and related method of manufacturing a magnetic recording medium that has a protective layer for the magnetic recording medium and that exhibits excellent corrosion resistance in the protective layer. The magnetic recording medium includes on a nonmagnetic substrate a magnetic layer and a protective layer formed on the magnetic layer. The protective layer is formed of a lower layer in contact with the magnetic layer and an upper layer formed on the lower layer. The material used in the lower layer is a metal having a standard electrode potential of −0.8 to 0.3 V.

3 Claims, 2 Drawing Sheets

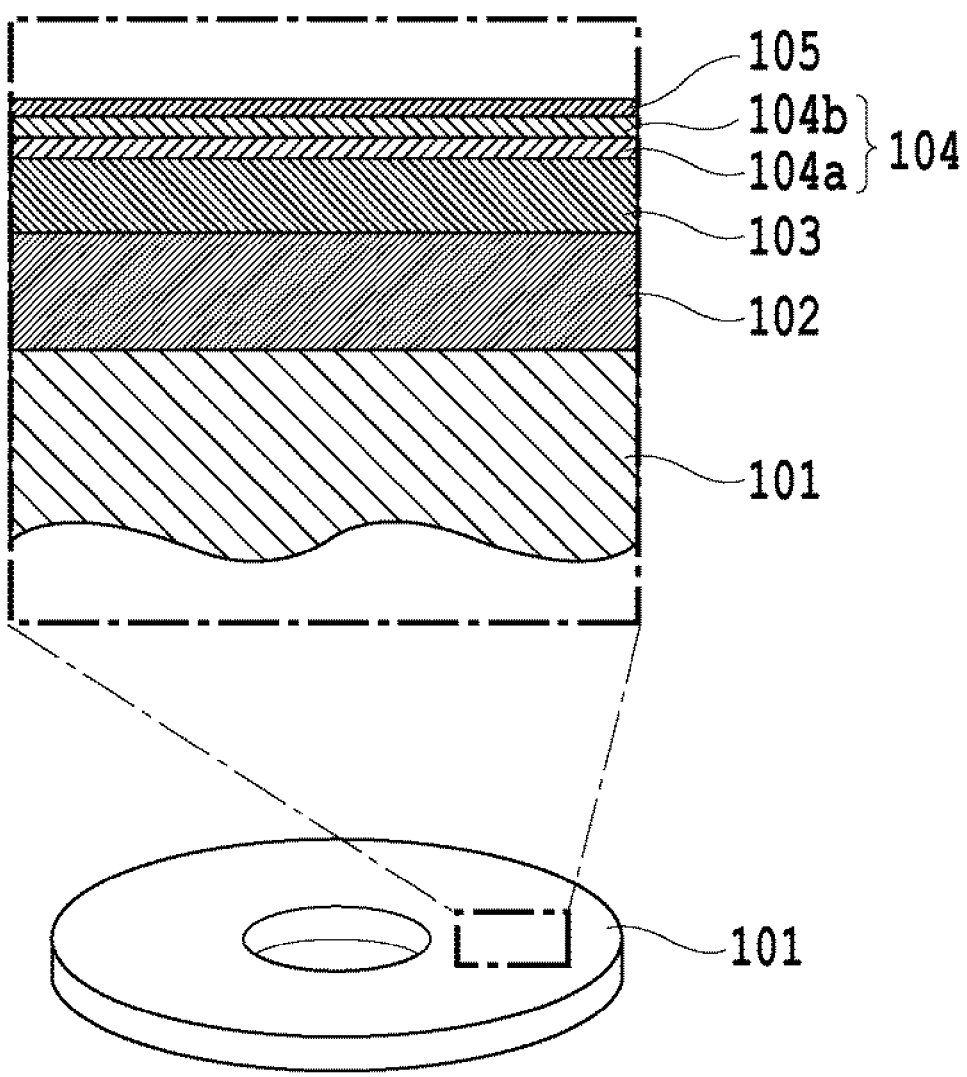

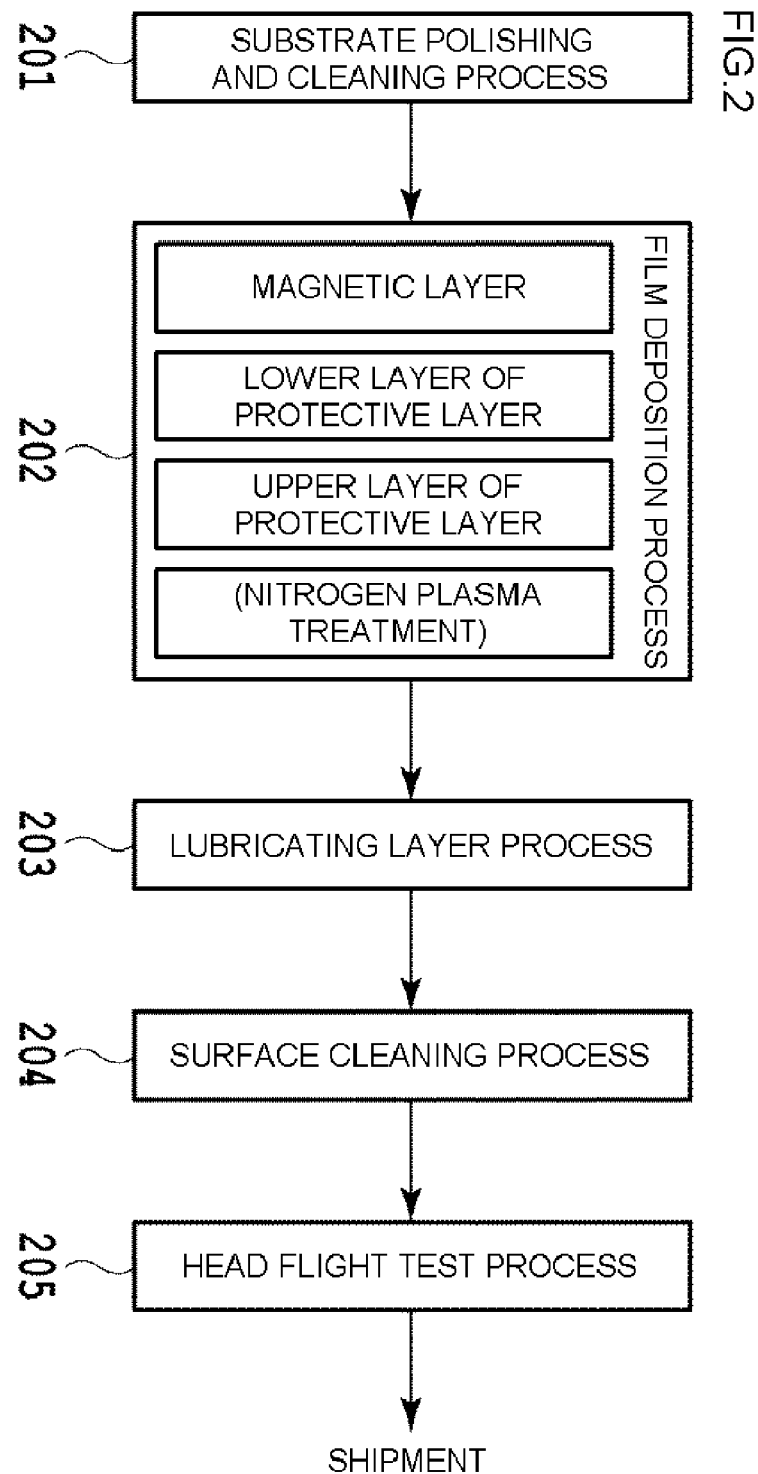

MAGNETIC RECORDING MEDIUM AND METHOD OF MANUFACTURING SAME

CROSS-REFERENCE TO RELATED APPLICATIONS

This application claims the foreign priority benefit of Japanese Application No. 2012-136078, filed Jun. 15, 2012, in the Japanese Intellectual Property Office, the disclosure of which is incorporated herein by reference.

BACKGROUND

1. Field

Embodiments of the invention relate to a magnetic recording medium. More specifically, embodiments of the invention relate to a magnetic recording medium having a protective layer which is thinner and has improved corrosion resistance. Embodiments of invention also relate to a method of manufacturing the magnetic recording medium.

2. Description of the Related Art

The recording capacities of hard disk drives continue to increase ceaselessly, and the recording densities of the magnetic recording media mounted in such drives also continue to rise. As a result of such higher magnetic recording densities, demands have arisen for the read/write head to be brought closer to the recording medium surface, that is, for the distance (magnetic spacing) between the head and the magnetic layer of the magnetic recording medium to be reduced, in order to write to smaller magnetization regions with a higher SN ratio. As one means of reducing the magnetic spacing, reduction of the thickness of the protective layer formed on the magnetic layer, and of the lubricating layer formed thereupon, has been sought.

A protective layer serves to protect the magnetic layer, and must have excellent corrosion resistance, in order that the magnetic layer, comprising metal material, does not react with water or corrosive gas in the atmosphere and corrode. In addition, the protective layer must be durable with respect to head flight, in order that the magnetic layer does not sustain damage even when a head flying at a high relative velocity over the magnetic recording medium with a slight magnetic spacing makes contact with the magnetic recording medium due to some problem. In general, from the standpoints of durability and corrosion resistance, a diamond-like carbon (DLC) film, in which carbon atoms are strongly bonded with finer texture, is used as the protective layer.

Further, a lubricating layer is a layer of a lubricant, formed extremely thinly on the protective layer such that the head can fly smoothly and stably over the magnetic recording medium, and is the uppermost layer of the magnetic recording medium.

In order to improve corrosion resistance, when forming a DLC protective layer, a method of mixing a hydrocarbon gas and hydrogen gas and applying a substrate bias voltage (Japanese Patent Application Laid-open No. 2006-114182), a method of plasma treatment of the surface of the magnetic layer (Japanese Patent Application Laid-open No. 2006-127619), a method of modifying a bias application method during protective film fabrication (Japanese Patent Application Laid-open No. 2007-46115), and a method of regulating the hydrogen content of the protective film (Japanese Patent Application Laid-open No. 2008-123646), have been disclosed. However, in the cases of all of these protective layers, the magnetic layer is extremely easily corroded, so that from the standpoint of corrosion prevention, a protective layer with a film thickness of approximately 5 nm or greater has been required.

Further, the thinner the protective layer is made, the greater is the proportion of strain in the protective layer due to differences in thermal expansion coefficients and other physical properties of the magnetic layer and the protective layer, due to interface mismatch effects, and similar, so that durability is degraded. In Japanese Patent Application Laid-open No. H9-138943, a buffer layer which effectively alleviates such strain is provided between the protective layer and the magnetic layer, to enable a thinner protective layer.

Design guidelines for the hard disk drives of coming products have been described, and a recording density of 1 Tb/in$^2$ and magnetic spacing of 6.5 nm have been proposed. Upon considering the breakdown of the magnetic spacing, the magnetic head's protective layer thickness is approximately 2 nm, the spacing between the uppermost face of the magnetic head and the uppermost face of the magnetic recording medium (the head flying height) is approximately 2 nm, and the lubricating layer of the magnetic recording medium is approximately 0.5 to 1 nm, and hence the thickness of the protective layer of the magnetic recording medium must be 2 nm or less. That is, a protective layer which is even thinner, and moreover affords excellent durability and corrosion resistance, is sought.

Embodiments of the invention provide a protective layer for a magnetic recording medium, having a thickness of 2.5 nm or less and high corrosion resistance. By using this protective layer, a magnetic recording medium is provided which can accommodate high recording densities exceeding 1 Tb/in$^2$.

SUMMARY

A first aspect of the invention provides a magnetic recording medium including on a nonmagnetic substrate a magnetic layer and a protective layer formed on the magnetic layer, in which the protective layer is formed of a lower layer in contact with the magnetic layer and an upper layer formed on the lower layer. The material used in the lower layer is an easily oxidized metal, and specifically a metal having a standard electrode potential of −0.8 to 0.3 V.

According to a second aspect of the invention, the lower layer of the protective layer has a film thickness of at least 0.3 nm, the upper layer of the protective layer is formed from diamond-like carbon (DLC), and the total film thickness of the protective layer is at least 1.5 nm.

According to a third aspect of the invention, it is preferable that the material used in the lower layer of the protective layer be selected from a group consisting of zinc, indium, tin, germanium, or a mixture of these.

According to a fourth aspect of the invention, it is preferable that the film thickness of the protective layer be 2.5 nm or less.

A fifth aspect of the invention provides a method of improving corrosion resistance of a magnetic recording medium including on a nonmagnetic substrate a magnetic layer and a protective layer formed on the magnetic layer, in which the protective layer is formed of a lower layer in contact with the magnetic layer and an upper layer formed on the lower layer. The lower layer of the protective layer is formed from a material having a standard electrode potential of −0.8 to 0.3 V, and the total film thickness of the protective layer is at least 1.5 nm.

A sixth aspect of the invention provides a method of manufacturing a magnetic recording medium. The method includes a process of stacking material having a standard electrode potential of −0.8 to 0.3 V on a magnetic layer formed on a nonmagnetic substrate to form a lower layer of a protective layer, and a process of forming a DLC layer on the lower layer of the protective layer, to form an upper layer of the protective layer.

By means of the aspects of the invention, a protective layer of thickness 2.5 nm or less can have high corrosion resistance. Further, by using this protective layer, a magnetic recording medium which accommodates a high recording density exceeding 1 Tb/in$^2$ can be provided.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

FIG. 1 is a cross-sectional view and perspective view showing an example of a magnetic recording medium used in embodiments of the invention.

FIG. 2 is a flowchart showing an example of processes to manufacture a magnetic recording medium of embodiments of the invention.

DESCRIPTION OF EMBODIMENTS

Below, a preferred embodiment of the invention is explained in detail referring to the drawings. The following embodiment is merely one example of the invention, and appropriate design modifications can be made by a person skilled in the art.

FIG. 1 is a cross-sectional view showing the configuration of one embodiment of a magnetic recording medium of embodiments of the invention. The magnetic recording medium of embodiments of the invention has a nonmagnetic substrate 101; a layer 102 including a soft magnetic layer formed on the nonmagnetic substrate 101; a magnetic layer 103 formed on the layer 102 including the soft magnetic layer; a lower layer 104a of a protective layer formed on the magnetic layer 103; an upper layer 104b of the protective layer formed on the lower layer 104a of the protective layer; and a lubricating layer 105 formed on the upper layer 104b of the protective layer.

(Nonmagnetic Substrate)

The nonmagnetic substrate 101 used in embodiments of the invention is a nonmagnetic member; a member which can withstand conditions (solvents, temperatures and similar) used in forming the various layers, described below. It is also preferable that the substrate have excellent dimensional stability. Still more specifically, a substrate comprising glass, an Al alloy, silicon, various plastics, or similar can be used.

(Layer Including Soft Magnetic Layer)

The layer 102 including a soft magnetic layer may be a single soft magnetic layer, or may combine a soft magnetic layer and another layer, as described below. The soft magnetic layer is a layer to concentrate the perpendicular-direction magnetic field in the magnetic layer 103. No limitations in particular are imposed, but it is preferable that the soft magnetic layer include at least one from among Fe, Co, Ni, Ta and Zr. For example, the soft magnetic layer can be formed using various soft magnetic materials such as Co—Zr based alloys, Fe—Co based materials, Fe—B based materials, ferrites, and similar.

The soft magnetic layer can be formed as a single-layer film having a specific composition. Further, a stacked film may be used, in which a plurality of magnetic films are caused to be coupled ferromagnetically or antiferromagnetically, so as to stabilize the magnetization recorded in the magnetic layer 103 and increase the magnetization intensity leaking from the medium surface and increase the recording efficiency of the recording head, reducing recording medium noise as a result.

The layer 102 including the soft magnetic layer may further include, in addition to the soft magnetic layer, an intermediate layer (not shown). The intermediate layer can be formed using Ru, Re, Os, or another hexagonal crystal structure metal, or an alloy including these. The intermediate layer can adjust the magnetic exchange interaction between the magnetic layer 103 and the soft magnetic layer.

Further, in the layer 102 including the soft magnetic layer, an orientation control layer (not shown) may be provided as necessary between the soft magnetic layer and the intermediate layer in order to efficiently orient the intermediate layer. As the material, it is preferable that a nonmagnetic Co alloy or Ni alloy be used; these are effective in reducing dispersion of crystal grain diameters.

It is preferable that the layer 102 including the soft magnetic layer have a thickness of approximately 20 to 300 nm.

(Magnetic Layer)

The magnetic layer 103 formed on the layer 102 including the soft magnetic layer may be a perpendicular magnetic film comprising an alloy of which the main component is Co; in addition to alloy films of CoCr based, CoPt based and similar, granular films using these and similar can be used. The "main component" means the component with the greatest content (weight percent) among the components comprised by the magnetic layer 103. Here, in addition to Co, it is preferable that the magnetic layer 103 further include Pt, Cr and O. By using such a configuration, a magnetic layer can be provided having good crystallinity, inheriting the crystal grain diameters and segregation structure of the layer 102 including the soft magnetic layer.

The magnetic layer 103 may comprise a single layer. The magnetic layer 103 may also comprise a plurality of layers, and $SiO_2$ or another oxide may be added to the magnetic layer 103 so as to magnetically isolate the crystal grain boundaries of the magnetic layer metal, with the object of reducing noise in magnetic recording signals. For example, the magnetic layer 103 may comprise a first magnetic layer and a second magnetic layer, and may have a coupling control layer (not shown) between the first magnetic layer and the second magnetic layer.

It is preferable that the magnetic layer 103 be formed to a thickness of approximately 5 to 50 nm.

As film fabrication methods for each of the above-described layers, in addition to sputtering methods (including DC magnetron sputtering methods, RF magnetron sputtering methods, and similar), evaporation deposition methods, application methods, and other any methods known in the technical field of film fabrication can be performed. From the standpoint of controllability and similar, use of a DC magnetron sputtering method is suitable. For example, a layer 102 including a soft magnetic layer comprising Co, Ta, Ru or similar can be deposited to a thickness of 60 nm by a sputtering method, and then a magnetic layer 103 comprising CoCrPt—$SiO_2$ can be deposited to a thickness of 20 nm by a sputtering method.

(Protective Layer)

A protective layer 104 in embodiments of the invention of this application is formed from a lower layer 104a of the protective layer and an upper layer 104b of the protective layer. The film thickness of the lower layer 104a of the protective layer need only be sufficient to enable adequate corrosion resistance, and is preferably 0.3 nm or greater. The thickness of the protective layer 104 is 1.5 nm or greater, and preferably the thickness of the protective layer 104 is 2.5 nm or less.

The lower layer 104a of the protective layer is formed using an easily oxidized material, and preferably has a standard electrode potential of −0.8 to 0.3 V. While no limitation is imposed, materials which can be used in the lower layer 104a of the protective layer in embodiments of the invention of this application include Zn (−0.8 V), In (−0.3 V), Sn (−0.1 V), and Ge (0.2 V) (where values in parentheses ( ) indicate standard electrode potentials).

The upper layer 104b of the protective layer can be fabricated by using a plasma CVD method to deposit DLC. A plasma CVD method is a method in which energy is imparted to a compound gas including the atoms which are to form the film, putting the gas into a plasma state, and active ions and radicals are generated to cause chemical reactions, to form a thin film. As the raw material gas used to deposit DLC, a hydrocarbon gas, such as methane ($CH_4$), ethylene ($C_2H_4$), acetylene ($C_2H_2$), toluene ($C_7H_8$), or similar is used.

After fabrication of the upper layer 104b of the protective layer, the surface of the protective layer 104 may be subjected to treatment to reduce liquid-repelling properties, in order to improve applicability of the lubricant. For example, a plasma may be generated in a chamber into which nitrogen gas has been introduced, to perform nitrogen plasma treatment in which active nitrogen ions and nitrogen radicals are caused to react with the protective layer surface (see for example Japanese Patent Application Laid-open No. 2001-266328).

(Lubricating Layer)

A liquid lubricant is applied to form a lubricating layer 105 on the upper layer 104b of the protective layer. As the liquid lubricant, for example perfluoro polyether (PFPE) or similar is used, and application is performed using a dipping method or similar.

The magnetic recording medium with lubricant applied may be further subjected to heat treatment, for example by being left for a fixed time in an oven held at approximately 100° C. Through this heat treatment the force of bonding between the lubricating layer 105 and the protective layer 104 is enhanced, and a propensity of the lubricating layer 105 to be separated can be prevented.

By using a Fourier transform infrared analysis method (FT-IR) to measure the magnetic recording medium A without a lubricating layer in advance, and then performing a measurement of the magnetic recording medium B having a lubricating layer, the thickness of the lubricating layer 105 can be found from the difference in the two values. As a thickness for the lubricating layer enabling the layer to function, the lubricating layer is for example formed to 1.0 nm.

(Manufacturing Processes)

FIG. 2 shows an example of processes to manufacture a magnetic recording medium of embodiments of the invention. These processes may be performed for a single face of a substrate, or for both faces. When treatment is performed on both faces simultaneously, the magnetic recording medium manufactured can have equivalent performance on both faces.

As a first manufacturing process, in the substrate polishing and cleaning process 201, a donut-shape disc substrate 101 the parent material of which is glass or aluminum is polished to be flat with a roughness suitable for head flight, and then the polishing abrasive and residue are washed away to high precision. Specifically, in the substrate polishing and cleaning process 201, for example a substrate 101 the parent material of which is glass is polished until the surface roughness Ra is approximately 0.1 nm, and then ultrasonic cleaning and scrub-cleaning are used to adequately remove polishing abrasive and residue.

In the following film deposition process 202, a sputtering method is used to deposit a magnetic layer 103 comprising a metal material onto the disc substrate 101 within a film deposition apparatus held in vacuum. Before deposition of the magnetic layer 103, in order to improve the performance of the magnetic layer 103, a layer 102 including a soft magnetic layer may also be deposited to a thickness of approximately 20 to 300 nm. Specifically, for example a layer 102 including a soft magnetic layer of Co, Ta, Ru or similar may be deposited by a sputtering method to a thickness of 60 nm, after which a magnetic layer 103 comprising CoCrPt—$SiO_2$ is deposited by a sputtering method to a thickness of 20 nm.

After depositing the magnetic layer 103, the protective layer 104 is deposited in succession in the same film deposition apparatus held in vacuum. First, the lower layer 104a of the protective layer is deposited. Then, the upper layer 104b of the protective layer is deposited by a plasma CVD method. The total thickness of the lower layer 104a and upper layer 104b of the protective layer is 2.5 nm or less. In some cases, after depositing the upper layer 104b of the protective layer, nitrogen plasma treatment is performed.

Next, in the lubricating layer process 203, a liquid lubricant is applied onto the upper layer 104b of the protective layer to form the lubricating layer 105. As the liquid lubricant, for example perfluoro polyether (PFPE) or similar is used, and application employs a dipping method or similar. Specifically, for example a dipping method is used with the lubricant Z-Tetraol (manufactured by Solvay Solexis) to form the lubricating layer 105. The magnetic recording medium immersed in the lubricant solution is lifted up at a rate of for example 2 mm/sec. The magnetic recording medium with the lubricant applied is left for a fixed time in an oven held at a temperature of for example approximately 100° C.

Next, a surface cleaning process 204 is executed to remove protrusions and adhering matter on the surface which may impede head flight. Specifically, for example burnishing tape with abrasive particles of granularity #6000 is used to scan the entire face of the magnetic recording medium, to remove protrusions and adhering matter on the magnetic recording medium.

After this cleaning treatment, by using an surface quality inspection apparatus to inspect the surface of the magnetic recording medium, the surface of the magnetic recording medium is inspected for the occurrence of scratches resulting from the surface cleaning process 204.

Finally, glide tests are performed in the head flying test process 205. In a glide test, a glide head on which is mounted a piezo sensor is flown maintaining a prescribed flying height from the surface of the magnetic recording medium. When a protrusion existing on the surface of the magnetic recording medium is higher than the flying height, the glide head collides with the protrusion, and this is detected by the piezo sensor. If a collision is detected at even one place on the magnetic recording medium surface which is larger than a stipulated value, the magnetic recording medium is determined to be defective, and is not shipped from the factory. Specifically, for example a 30% slider glide head is set to fly at a linear velocity of 8.6 m/sec, and the entire surface is scanned. As the judgment criterion for the glide test, a medium is judged to pass if the voltage values generated by the piezo sensor are 200 mV or lower over the entire scanned range.

A magnetic recording medium of embodiments of the invention, manufactured as described above, can have both good corrosion resistance and good durability, even with a protective layer of film thickness 2.5 nm or less.

EXAMPLES

Below, examples for the embodiments of the invention are explained; however, the following examples in no way limit the scope of the invention, and various modifications can be made by a person skilled in the art without deviating from the gist of the invention.

Example 1

Based on the method indicated in FIG. 2, magnetic recording media A were obtained.

The lower layer 104a of the protective layer was formed by depositing Ge using DC sputtering at a DC power of 150 W. The thickness of the germanium film which was the lower layer 104a of the protective layer was made 0.3 nm (Example 1-1), 0.5 nm (Example 1-2) and 0.7 nm (Example 1-3).

Next, the upper layer 104b of the protective layer was formed by a plasma CVD method. In plasma CVD, the raw material gas $C_2H_4$ was supplied at a gas flow rate of 30 sccm, with the bias voltage between filament and substrate set at 100 V and at a plasma density of $6\times10^{10}$ $cm^{-3}$. The upper layer 104b of the protective layer was formed such that the total film thickness of the lower layer 104a and upper layer 104b of the protective layer was 2.5 nm.

The magnetic recording media A thus obtained were subjected to corrosion resistance tests, described below. Results are shown in Table 1.

In addition, the magnetic recording media A were subjected to nitrogen plasma treatment and application of a lubricant, to obtain the magnetic recording media B. The nitrogen plasma treatment was performed to obtain the lubricating layer thickness of 1.0 nm.

The magnetic recording media A subjected to nitrogen plasma treatment were subjected to XPS analysis, and the nitrogen content of the protective layer 104 was determined. Results are shown in Table 1.

Next, the above-described method was used to perform the surface cleaning process 204 for the magnetic recording media B. After the surface cleaning process 204, the magnetic recording media B were inspected for surface scratches using the surface quality inspection apparatus, and the method described in detail in the head flying test process 205 was used to perform glide tests. Results are shown in Table 1.

Example 2

Magnetic recording media were fabricated and evaluated similarly to Example 1-1, other than using zinc (Example 2-1), indium (Example 2-2), or tin (Example 2-3) as the material of the lower layer 104a of the protective layer. Results are shown in Table 1.

Example 3

Magnetic recording media were fabricated and evaluated similarly to Example 1 other than adjusting the film thicknesses of the lower layer 104a and upper layer 104b of the protective layer such that the total thickness was 2 nm (Example 3-1) or 1.5 nm (Example 3-2). Results are shown in Table 1.

Comparative Example 1

As compared to Example 1, a lower layer 104a of the protective layer was not deposited, and the upper layer 104b of the protective layer alone was deposited to a thickness of 2.5 nm to fabricate a magnetic recording medium, and characteristic evaluations similar to those of Example 1 were performed. Results are shown in Table 1.

Comparative Example 2

A magnetic recording medium similar to that of Example 1 was fabricated and evaluated other than making the film thickness of the germanium which is the lower layer 104a of the protective layer 0.1 nm. Results are shown in Table 1.

Corrosion Resistance Tests

Corrosion resistance of a protective layer 104 was evaluated by dripping acid onto the surface of the magnetic recording medium A. The magnetic layer 103 of the magnetic recording medium A comprises a CoCr alloy, and thus by evaluating the amount of Co eluted in acid through the protective layer 104, it is possible to judge the corrosion resistance of the protective layer 104.

After dripping a fixed quantity of acid onto the magnetic recording medium A placed in a horizontal state and leaving the medium for a fixed length of time, the entire quantity of liquid was recovered. By using ICP-MS (Inductively Coupled Plasma Mass Spectrometry) to measure the Co quantity in the liquid, the corrosion resistance can be evaluated. Specifically, a 3% by volume solution of nitric acid was used, the quantity dripped was 0.8 ml, and the time for which the medium was left after dripping was one hour. The Co quantity obtained was divided by the area of the surface of the magnetic recording medium A with which the dripped liquid made contact, to obtain a Co eluted quantity per unit area. As a criterion for judging corrosion resistance, a Co elution quantity per unit area of 5 $ng/cm^2$ or less was taken to be the passing criterion, at which no problems have arisen within hard disk devices in tests in the past.

TABLE 1

| | | Example | | | | | | | | Comparative Example 1 | Comparative Example 2 |
|---|---|---|---|---|---|---|---|---|---|---|---|
| | | 1-1 | 1-2 | 1-3 | 2-1 | 2-2 | 2-3 | 3-1 | 3-2 | | |
| Protective layer configuration | Upper layer | DLC | DLC | DLC | DLC | DLC | DLC | DLC | DLC | DLC single layer | DLC |
| | Lower layer | Ge | Ge | Ge | Zn | In | Sn | Ge | Ge | | Ge |
| Protective layer thickness (nm) | Total | 2.5 | 2.5 | 2.5 | 2.5 | 2.5 | 2.5 | 2.0 | 1.5 | 2.5 | 2.5 |
| | Upper layer | 2.2 | 2.0 | 1.8 | 2.2 | 2.2 | 2.2 | 1.6 | 1.2 | — | 2.4 |
| | Lower layer | 0.3 | 0.5 | 0.7 | 0.3 | 0.3 | 0.3 | 0.4 | 0.3 | — | 0.1 |

TABLE 1-continued

| | Example | | | | | | | | Comparative Example 1 | Comparative Example 2 |
|---|---|---|---|---|---|---|---|---|---|---|
| | 1-1 | 1-2 | 1-3 | 2-1 | 2-2 | 2-3 | 3-1 | 3-2 | | |
| Nitrogen content in protective layer (%) | 12 | 11 | 9 | 11 | 10 | 10 | 10 | 9 | 19 | 17 |
| Lubricating layer thickness (nm) | 1.0 | 1.0 | 1.0 | 1.0 | 1.0 | 1.0 | 1.0 | 1.0 | 1.0 | 1.0 |
| Co elution amount (ng/cm$^2$) | 0.30 | 0.31 | 0.28 | 0.20 | 0.25 | 0.28 | 0.85 | 3.3 | 7.4 | 6.8 |
| Judgment | pass | pass | pass | pass | pass | pass | pass | pass | fail | fail |
| Scratches after surface cleaning | no | no | no | no | no | no | no | no | no | no |
| Glide test | pass | pass | pass | pass | pass | pass | pass | pass | pass | pass |
| Overall evaluation | pass | pass | pass | pass | pass | pass | pass | pass | fail | fail |

In Examples 1-1 to 1-3 and 2-1 to 2-3, in which the film thickness of the lower layer 104a of the protective layer was 0.3 nm or greater and the total film thickness of the protective layer 104 was 2.5 nm, whether the lower layer 104a of the protective layer was of germanium, zinc, indium or tin, the fabricated magnetic recording media had sufficient corrosion resistance and durability.

Further, in Examples 3-1 and 3-2, in which the total film thickness of the protective layer 104 was smaller, as 2.0 nm and 1.5 nm, although there was an increase in Co elution quantities compared with Examples 1 and 2, magnetic recording media with adequate corrosion resistance and durability were also obtained.

On the other hand, in Comparative Example 1 which did not have a lower layer 104a of the protective layer, and Comparative Example 2 which did not have a lower layer 104a of the protective layer of adequate film thickness, the Co elusion quantities were large, and adequate corrosion resistance was not obtained.

Although not dependent upon theory, it is thought that by selecting a material which is easily oxidized for the lower layer 104a of the protective layer, oxygen which has passed through the DLC layer which is the upper layer 104b of the protective layer bonds with the material of the lower layer 104a of the protective layer, causing volume expansion, so that a protective layer with finer texture is formed.

A list and description of reference numerals and symbols used herein are as noted below:
101 Substrate
102 Layer including soft magnetic layer
103 Magnetic layer
104 Protective layer
104a Lower layer of protective layer
104b Upper layer of protective layer
105 Lubricating layer
201 Substrate polishing and cleaning process
202 Film deposition process
203 Lubricating layer process
204 Surface cleaning process
205 Head flying test process Although a few embodiments have been shown and described, it would be appreciated by those skilled in the art that changes may be made in these embodiments without departing from the principles and spirit of the invention, the scope of which is defined in the claims and their equivalents.

What is claimed is:

1. A magnetic recording medium comprising:
    a nonmagnetic substrate;
    a magnetic layer on the nonmagnetic substrate; and
    a protective layer on the magnetic layer, the protective layer having a total film thickness of at least 1.5 nm and 2.5 nm or less, and comprising
        a lower layer, in contact with the magnetic layer, that is formed from a material having a standard electrode potential of −0.8 to 0.3 V and has a film thickness of at least 0.3 nm, the material being Zn, In or a mixture thereof, and
        an upper layer formed on the lower layer and formed from diamond-like carbon (DLC).

2. A method of improving corrosion resistance of a magnetic recording medium having a nonmagnetic substrate and a magnetic layer on the nonmagnetic substrate, comprising:
    forming a protective layer having a total thickness of at least 1.5 nm and 2.5 nm or less, on the magnetic layer, the forming the protective layer including
        forming a lower layer of the protective layer from a material having a standard electrode potential of −0.8 to 0.3 V and in contact with the magnetic layer, the material being Zn, In or a mixture thereof, and
        forming an upper layer of the protective layer on the lower layer.

3. A method of manufacturing a magnetic recording medium,
    the method comprising:
    stacking, on a magnetic layer formed on a nonmagnetic substrate, a material having a standard electrode potential of −0.8 to 0.3 V, to form a lower layer of a protective layer, the material being Zn, In or a mixture thereof; and
    forming a diamond-like carbon (DLC) layer on the lower layer of the protective layer, to form an upper layer of the protective layer,
    the lower and upper layers of the protective layer having a total combined thickness of 2.5 nm or less.

* * * * *